(12) United States Patent
Maeda

(10) Patent No.: US 6,275,457 B1
(45) Date of Patent: Aug. 14, 2001

(54) RECORDING MEDIUM AND REPRODUCING APPARATUS

(75) Inventor: Muneyasu Maeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/283,189

(22) Filed: Apr. 1, 1999

(51) Int. Cl.$^7$ .................................................. G11B 7/00
(52) U.S. Cl. .................................. 369/47.21; 369/47.25; 369/275.3
(58) Field of Search ........................... 369/47.21, 47.25, 369/47.26, 275.3

(56) References Cited

U.S. PATENT DOCUMENTS 5,745,454 * 4/1998 Yokota .............................. 369/47.21

* cited by examiner

Primary Examiner—Nabil Hindi
(74) Attorney, Agent, or Firm—Jay H. Maioli

(57) ABSTRACT

A recording medium includes a program area in which digital data made up of a header, main data and sub-data is blocked and recorded with a variable number of sectors, with a unit sector being of a pre-set data length, and a management area in which there is recorded an identifier for discriminating the variable number of sectors in order to render the data volume of the sub-data variable with the volume of main data in the packet remaining fixed.

10 Claims, 7 Drawing Sheets

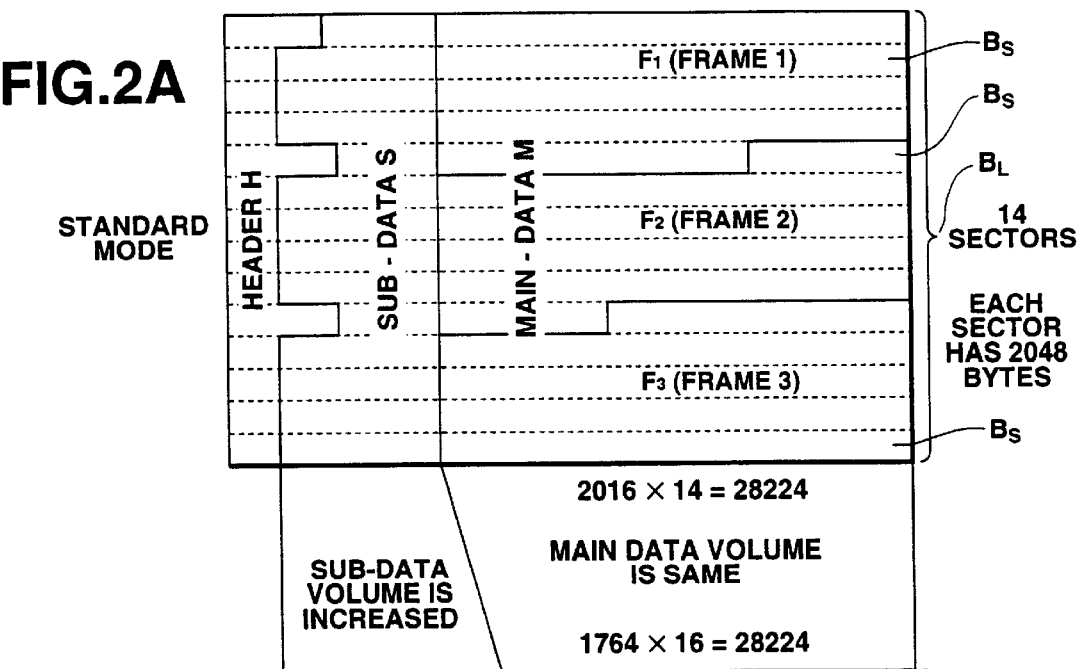
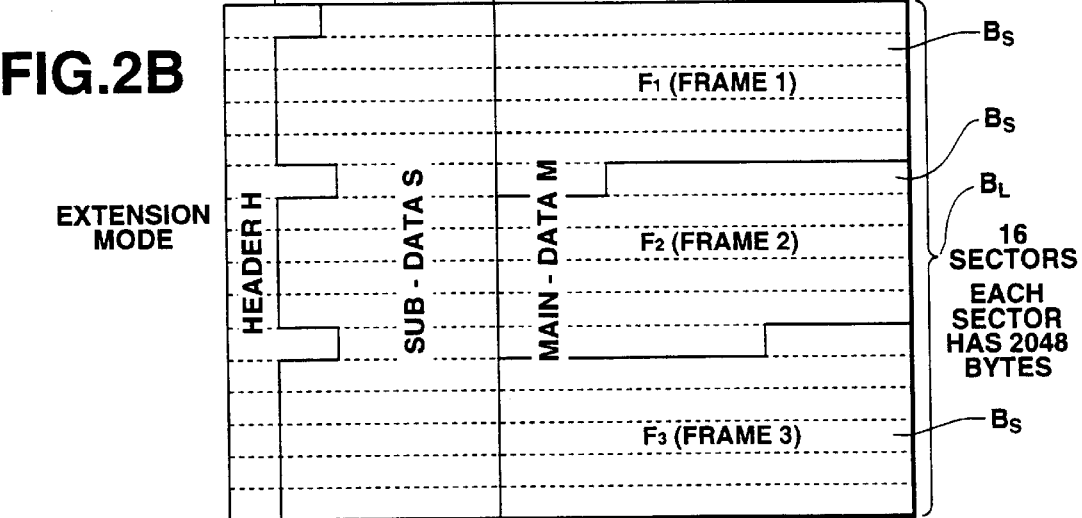

RECORDING 3-FRAME DATA IN 16 SECTORS
(EXTENSION MODE)

FIG.5A CD LAYER

FIG.5B HD LAYER

RECORDING MEDIUM AND REPRODUCING APPARATUS

BACKGROUND OF THE INVENTION

1. Field of the Invention

This invention relates to a recording medium in which data can be recorded in terms of headers, main data and sub-data as plural unit blocks and in which the recording capacity for the sub-data can be varied without decreasing the recording capacity of the main data. This invention also relates to a reproducing apparatus for reproducing the recording medium.

2. Description of the Related Art

In a conventional recording medium, there is provided, separate from a region for recording main data signals, a recording region for sub-data signals read out simultaneously with the main data signals. These sub-data signals, also termed sub-data or sub-codes, are used for recording the ancillary information, such as graphics information or text data.

In a compact disc (CD, registered trade mark), for example, there is provided, separate from the region for recording audio signal data, a region for recording sub-data that can be reproduced simultaneously as the audio signals are reproduced. These sub-data include letters, graphics, etc in addition to the information such as the numbers of musical numbers, indexes or playing time. In CD-G (CD-graphics), for example, the graphics information is recorded in six bits termed user bits of the sub-data so that a picture or a lyric is displayed simultaneously with the accompaniment (karaoke).

Meanwhile, since the data transfer speed of sub-data is of the order of several kBps, such as 5.4 kBps (kilobyte per second), the graphics information that can be recorded as sub-data cannot be expected to be of a high quality. This is far below the 64 kBps required for so-called streaming reproduction on the Internet now in popular use world-wide. Insofar as the still picture is concerned, the data transfer rate for displaying the high-quality still picture, encoded by the JPEG (Joint Photographic Experts Group) format or the GIF (graphics interchange format) now in popular use, cannot be met.

In order to cope with the streaming reproduction or high-quality still picture, a high transfer rate exceeding 64 kBps for ancillary data is required. However, for realizing the high transfer rate, it is necessary to provide a region for a large amount of the ancillary information needs, as a result of which the main data region is decreased. If the main data region is decreased, the net result is the decreased music reproducing time or the lowered sound quality.

SUMMARY OF THE INVENTION

It is therefore an object of the present invention to provide a recording medium in which a transfer rate at least higher than the transfer rate for sub-data of a conventional compact disc is assured and a higher transfer rate can be variably assured, and a reproducing apparatus in which the sub-data transfer rate can be variably switched when reproducing this recording medium.

In one aspect, the present invention provides a recording medium including a program area in which digital data made up of a header, main data and sub-data is blocked and recorded with a variable number of sectors, with a unit sector being of a pre-set data length, and a management area in which there is recorded an identifier for discriminating the variable number of sectors in order to render the data volume of the sub-data variable with the volume of main data in the packet remaining fixed.

In another aspect, the present invention provides a recording/reproducing apparatus for reproducing a recording medium having a program area in which digital data made up of a header, main data and sub-data is blocked and recorded with a variable number of sectors, with a unit sector being of a pre-set data length, and a management area having recorded therein an identifier for discriminating the variable number of sectors in order to render the data volume of the sub-data variable with the volume of main data in the packet remaining fixed. Specifically, the recording/reproducing apparatus includes reproducing means for reproducing the digital data recorded in the program area and the identifier recorded in the management area, separating means for separating the main data and the sub-data from the digital data reproduced by the reproducing means from the program area of the recording medium, and control means for controlling the separating means based on the identifier that is reproduced from the management area of the recording medium by the reproducing means and which is used for identifying the variable number of sectors.

The recording medium of the present invention, as described above, has a transfer rate at least higher than the sub-data transfer rate of the conventional compact disc and is able to secure a higher variable transfer rate. Moreover, the reproducing device according to the present invention is able to variably switch the sub-rate transfer rate at the time of reproducing this recording medium.

BRIEF DESCRIPTION OF THE DRAWINGS

FIG. 2A shows a data structure of a standard mode in which the number of sectors per unit frame is 14/3 (sectors/frame).

FIG. 2B shows a data structure of an extension mode in which the number of sectors per unit frame is 16/3 (sectors/frame).

DESCRIPTION OF THE PREFERRED EMBODIMENTS

Figure 1:
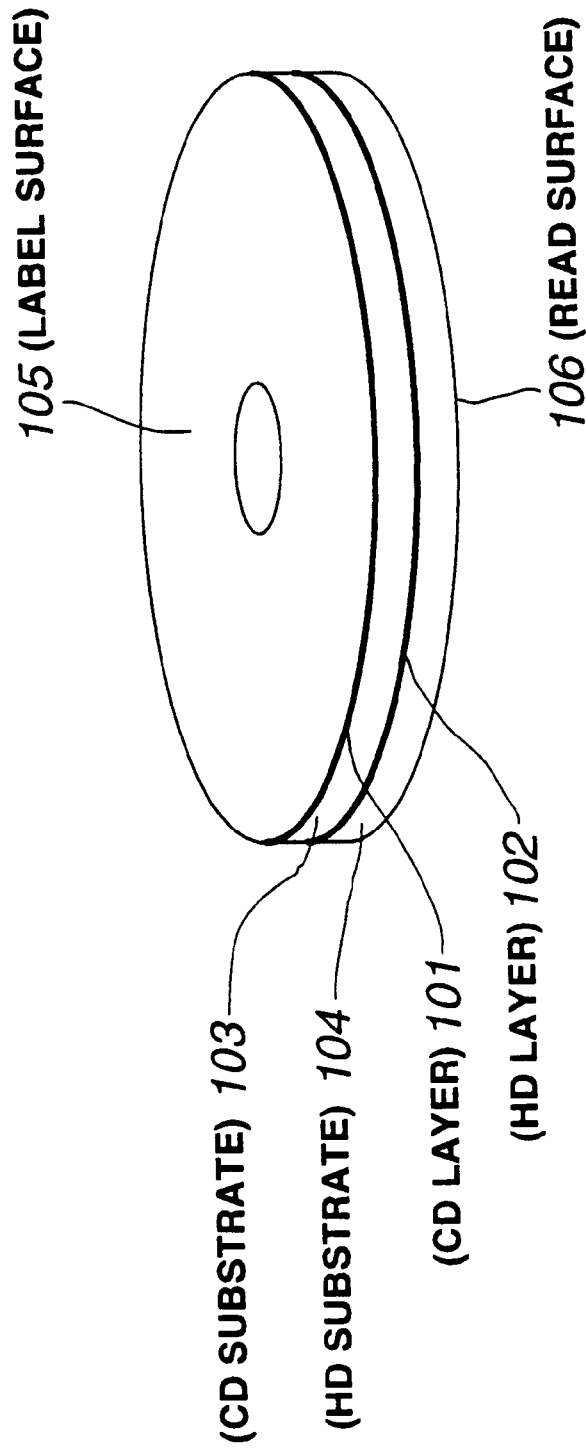
FIG. 1 is a perspective view showing a double-layer disc embodying the present invention.

FIG. 1 shows the structure of a multi-layered disc applied to a reproducing device according to an embodiment of the present invention. The multi-layered disc is an optical disc having a diameter of approximately 12 cm and a thickness of 1.2 mm and has a layered structure made up of a label surface 105 on the upper surface, a CD layer 101, a CD substrate 103, a high-density (HD) layer 102, a HD substrate 104 and a read surface 106.

As may be seen from the above-described structure, the two layers of the CD layer 101 and the HD layer 102 are formed to serve as the recording layers. On the CD layer 101 are recorded 16-bit digital audio signals, sampled at 44.1 kHz, as in the case of the CD, whereas, on the other layer, that is on the HD layer 102, there are recorded 1-bit digital audio signals, $\Delta\Sigma$ modulated at 2.842 MHz, which is an extremely high sampling frequency as high as 16 times the above-mentioned 44.1 kHz.

As for the frequency range, the CD layer 101 has a frequency range of 5 to 20 kHz, while the HD layer 102 is able to realize a broad frequency range of from the dc component to 100 kHz.

As for the dynamic range, the CD layer 101 can realize 98 dB for the entire audio range, whereas the HD layer 102 can realize the frequency range of 120 dB for the entire audio range.

The minimum pit length of the CD layer 101 is 0.83 $\mu$m, whereas that of the HD layer 102 is 0.4 $\mu$m.

The track pitch of the CD layer 101 is 1.6 $\mu$m, whereas that of the HD layer 102 is 0.74 $\mu$m.

The read-out laser wavelength of the CD layer 101 is 780 nm, whereas that of the HD layer 102 is shorter and is 650 nm.

The numerical aperture NA of the lens of the optical pickup is 0.45 and 0.6 for the CD layer 101 and for the HD layer 102, respectively.

By varying the minimum pit length, track pitch, numerical aperture of the lens and the laser wavelength in this manner, the data capacity of the HD layer 102 can be set to as high as 4.7 GB in comparison with the data capacity of the CD layer 101 of 780 MB.

The $\Delta\Sigma$ modulated 64 Fs, 1 bit audio signals, recorded on the HD layer 102, are hereinafter termed high-speed 1-bit audio signals.

Since the digital signals of the same recording configuration as that of the single-layer compact disc, currently on sale, are recorded on one of the layers of the double-layer disc, while digital signals of the recording configuration, higher in quality than the single-layer compact disc, currently on sale, are recorded on the other layer, at least the CD layer 101 can be reproduced by a CD player, now on sale world-wide, while both the CD layer 101 and the HD layer 102 can be reproduced by a reproducing device designed to cope with the HD layer.

The reproducing device adapted to cope with the HD layer is able to reproduce the single-layer compact disc currently on sale.

Two channels of the above-mentioned high-speed 1-bot audio signals (64Fs, 1 bit, Fs being 44.1 kHz) correspond to 705600 bytes (705.6 kB) per second, such that, if one second corresponds to 75 frames, each frame corresponds to 9408 bytes. Thus, for recording 3-frame signals, 28224 bytes are required, whereas, for recording main data using sectors each made up of 2048 bytes, 14 sectors (28672 bytes)or more suffice.

According to the present invention, the recording capacity per unit time of supplementary data (sub-data) recording the ancillary information such as graphics information is changed without changing the quality of the audio signals recorded as main data.

Specifically, such a mode in which the number of sectors is set to 14 is set as the standard mode, and the recording capacity of 448(=28672−28224) excluding the main data M is utilized along with the header H as sub-data S.

Also, such a mode in which the number of sectors is set to 16 is set as an extension mode, and a recording capacity of 4544(=32768−28224) bytes excluding the main data M having a fixed data volume (=28224 bytes) is utilized along with the header H as the sub-data S.

FIGS. 2A and 2B show large-unit block data BL, comprised of plural layers of small-unit blocks Bs, for the standard mode recording and for the extension mode recording, respectively. Each small-unit block Bs is comprised of a header H, sub-data S and main data M recorded on the data zone 2 of the optical disc shown in FIG. 5B.

With this optical disc, the data volume of the main data M in the small-unit block Bs is fixed, whereas the numbers of sectors of the small unit blocks Bs is rendered variable, such as 14 sectors and 16 sectors, in terms of a large-unit block BL as a unit, whereby the data volume of the sub-data S is rendered variable, as shown in FIGS. 2A and 2B.

To summarize, the large-unit block BL recorded in the data zone in the standard mode is made up of 14 sectors, as shown in FIG. 2A, each sector being made up of 2048 bytes. The sector-based data volume of the main data M in each small-unit block Bs is 2016 bytes of the above-mentioned 2048 bytes. Therefore, the data volume of the main data M in the large-unit block BL of the standard mode is 2016× 14=28224 bytes. The data volume of 28224 bytes are evenly distributed in three frames F1, F2 and F3 of the above-mentioned three small-unit block Bs so that 9408 bytes are allocated to the three frames.

The large-unit block BL, recorded in the data zone by the extension mode, is made up of 16 sectors, as shown in FIG. 2B. The data volume of the sector-based main data M in each small-unit block Bs is 1764 bytes of the 2048 bytes. Since each sector is made up of 2048 bytes, the main data volume of the large-unit block BL with the extension mode is 1764×16=28224 bytes, which is the same as that of the standard mode. The data volume of 28224 bytes of the main data M is similarly distributed evenly to the three frames F1 to F3 of the small-unit block Bs so that 9408 bytes each are allocated to the frames F1 to F3.

On the other hand, the data volume of the sub-data S is larger in the large-unit block BL in the extension mode by a difference between the number of sectors of the large-unit block BL in the standard mode and the number of sectors of the large-unit block BL in the extension mode, that is two sectors (2048×2=) 4096 bytes. In actuality, the number of regular headers H is also increased by two and the data volume of 10 bytes are allocated to the headers H, so that the increased data volume is 4086 bytes.

Figure 3:
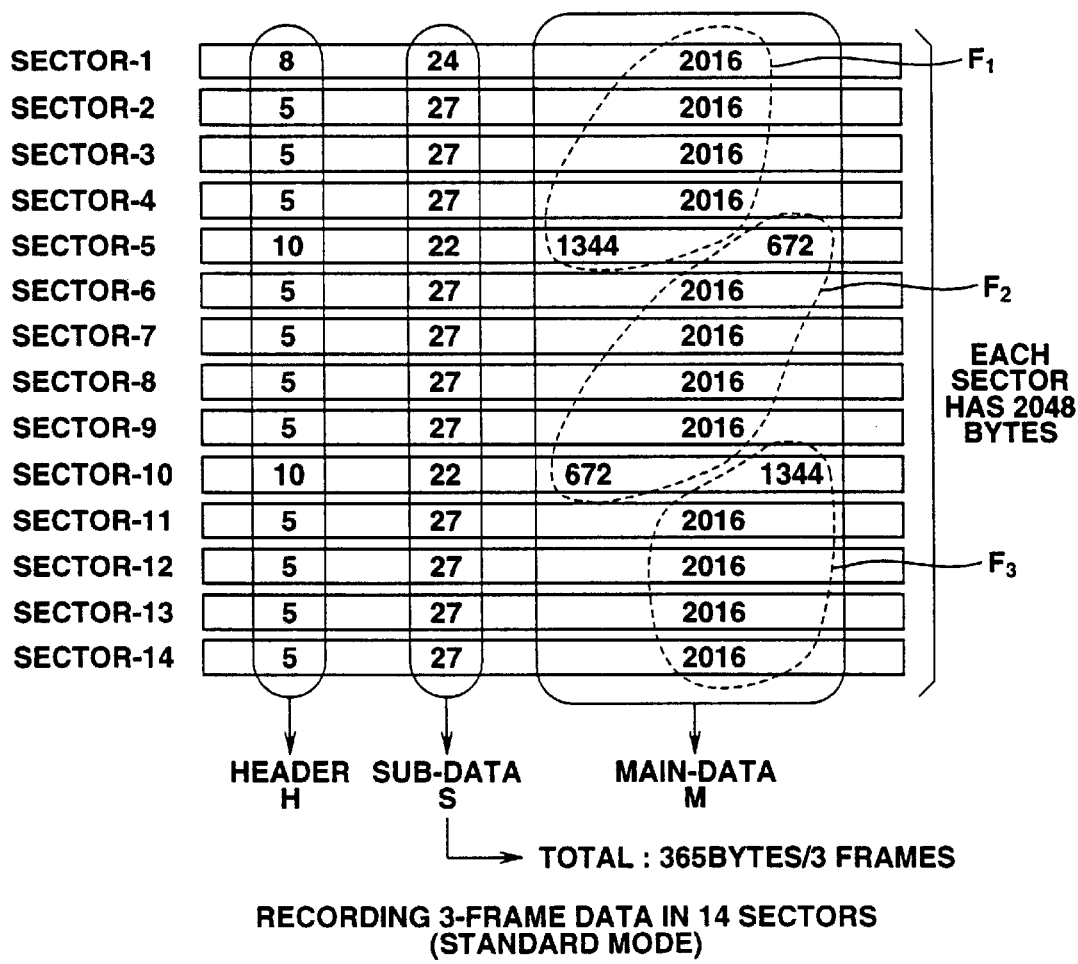
FIG. 3 shows a detailed data structure of the standard mode shown in FIG. 2A.
Figure 4:
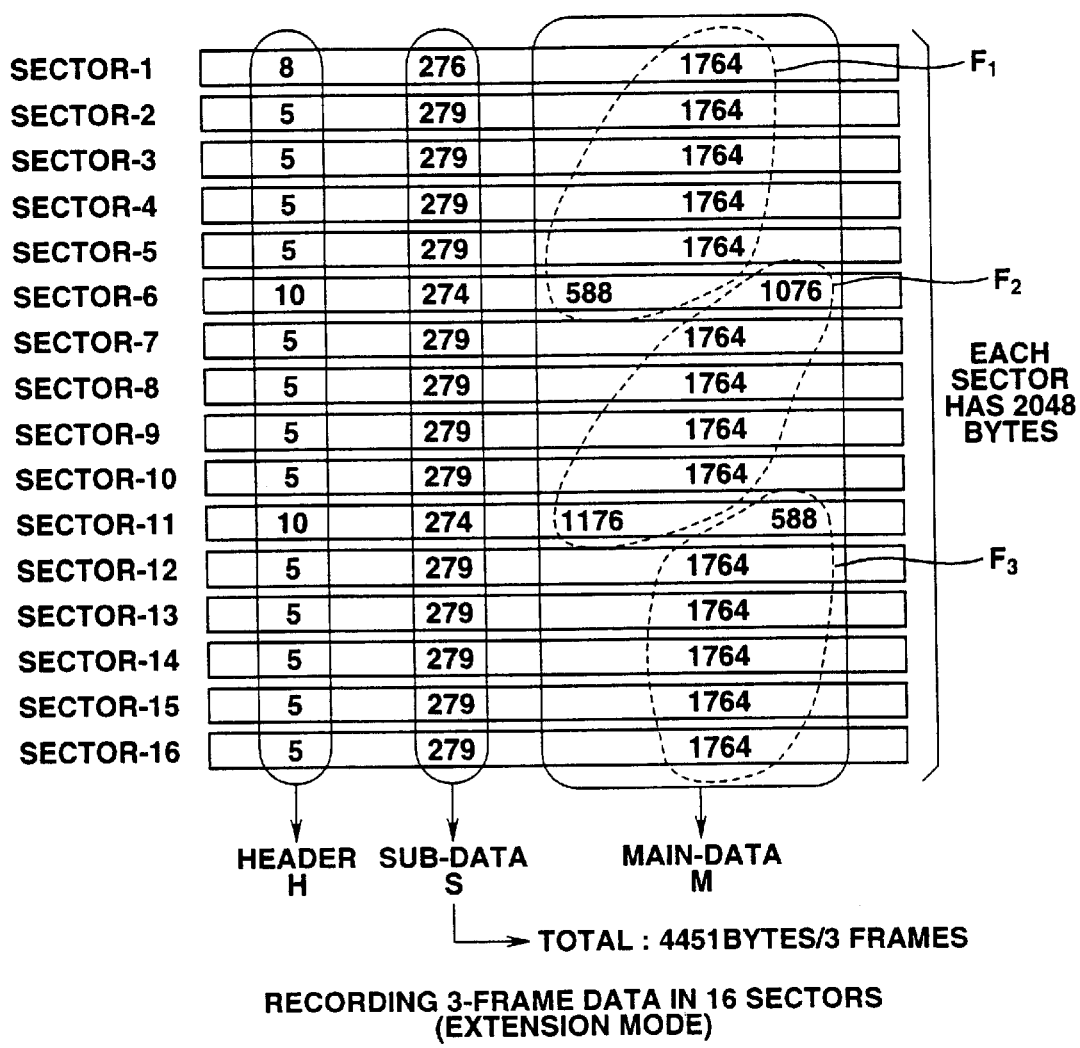
FIG. 4 shows a more detailed data structure of the extension mode shown in FIG. 2B.

FIGS. 3 and 4 show the detailed formats of the large-unit block BL in the above-mentioned standard mode and extension mode, respectively.

In FIG. 3, the first frame F1 in the first small-unit block Bs is constituted by bytes from the leading end of the main data of the sector 1 to the 1344th byte of the main data of the sector 5. That is, in the first frame F1 of the main data M, the data volume of 9408 bytes is divisionally recorded in the sector 1 to 1344th bytes in the sector 5. The data volume of the header H of the first small-unit block Bs is larger by 3 bytes than the header (5 bytes) of the other sector in the same small-unit block Bs, that is 8 bytes. The data volume of the header H will be explained subsequently. Since the header of the sector 1 is larger in volume by three bytes than the other header, the sub-data of the sector 1 is lesser by 3 bytes than 27 bytes of the data volume of the other sub-data, or is 24 bytes. The reason is that the header plus sub-data is fixed, as shown in FIG. 2A.

The second frame F2 of the second small-unit block Bs in FIG.3 is made up of 672 bytes as from the 1345th byte of the main data of the sector 5 up to the 672nd byte of the main data of the sector 10. That is, in the second frame F2 of the main data, the data volume of the 9408 bytes is divisionally recorded in 672 bytes of the sector 5, 2016×4(=8064) bytes of the sectors 6 to 9 and 672 bytes of the sector 10. As for the data volume of the second header H, since the leading sector 5 of the small-unit block Bs is in need of data representing the time code indicative of the beginning of the frame in the main data, sub-data and two main data, totalling three packets, the data volume of the second header H is 10 bytes, which is more than 8 bytes of the header of the sector 1 which is in need of the data volume for the sub-data and one main data totalling two packets and the time code indicative of the beginning of the frame. Since the header of the sector 5 is more by 5 bytes than the other headers (5 bytes), the subdata of the sector 5 is 22 bytes, which is less by 5 bytes than the data volume of 27bytes of the other sub-data.

The third frame F3 of the third small-unit block Bs in FIG. 3 is made up of data from the remaining 1344 bytes as from the 673rd byte of the main data of the sector 10 up to the end of the main data of the sector 14. That is, the third frame F3 of the main data divisionally records the 9408 byte data volume in 1344 bytes of the sector 10 and 2016×4(=8064) bytes of from the sector 11 to the sector 14. The data volume of the header H of the small-unit block Bs is 10 bytes since it is in need of data representing the time code indicative of the beginning of the frame in the main data, sub-data and two main data, totalling three packets. Since the header of the sector 10 is more by 5 bytes than the other headers (5 bytes), the sub-data of the sector 10 is 22 bytes which is lesser by 5 bytes than the 27 bytes of the data volume of the other sub-data, as in the second small-unit block Bs.

Thus, with the large-unit block BL of the standard mode shown in FIG. 3, the sum of the main data M of the three frames is set to 28224 byes, while the sum of the sub-data S is set to 365 bytes.

In FIG. 4, the first frame F1 in the first small-unit block Bs is made up of data from the beginning end of the main data of the sector 1 up to the 588th byte of the main data of the sector 6. That is, the first frame F1 of the main data has the data volume of 9408 bytes by the sum of data up to the 588th byte of the sector 6. That is, the first frame F1 of the main data has the data volume of 9408 bytes as the sum total up to the 588th byte of the sector 6. On the other hand, the data volume of the header H in the first small-unit block Bs is 8 bytes which is larger than the header of the other sectors in the same small-unit block Bs by 3 bytes, that is in an amount corresponding to the time code indicative of the frame beginning in the main data. Since the header of the sector 1 is larger by 3 bytes than the other headers, the sub-data of the sector 1 is 276 bytes which is lesser by 3 bytes than the data volume of 279 bytes of the other sub-data since the header plus sub-data is of a fixed volume as indicated in FIG. 2B.

On the other hand, the second frame F2 in the second small-unit block Bs in FIG. 4 is constituted by the remaining 1176 bytes as from the 589th byte of the main data of the sector 6 up to the 1176th byte of main data of the sector 11. That is, the second frame F2 of the main data divisionally records the data volume of 9408 bytes in 1176 bytes of the sector 6, 1764×4(=7056) bytes from the sector 7 to the sector 10 and 1176 bytes of the sector 11. Also, the header H of the second small-unit block Bs is in need of a data volume indicating a time code indicative of the frame beginning in the main data, and three packets for sub-data and for two main data, so that the data volume of the header H is 10 bytes larger by two bytes than 8 bytes of the header of the sector 1 which is in need of the data volume for two packets for the sub-data and one main data and the time code indicative of the frame beginning. Since the header of the sector 6 is larger by 5 bytes than the other header (5 bytes), the sub-data of the sector 6 is 274 bytes which is smaller by 5 bytes than the data volume of 279 bytes of the other sub-data.

Also, in FIG. 4, the third frame F3 of the third small-unit block Bs is constituted by the remaining 588 bytes as from the 1177th byte of main data of the sector 11 up to the end of the main data of the sector 16. That is, the third frame F3 of the main data records the data volume of 9408 bytes in 588 bytes of the sector 11 and 1764×5=8820 bytes of the sectors 12 to 16. The header H of the third small-unit block Bs has a data volume of 10 bytes since the leading sector 11 of the small-unit block Bs is in need of the time code indicative of the frame beginning in the main data and three packets for the sub-data and two main data. Since the header of the sector 11 is larger by 5 bytes than the other header of 5 bytes, the data volume of the sub-data of the sector 11 is 274 bytes which is lesser by 5 bytes than the data volume of 279 bytes of the other sub-data, as in the case of the above-mentioned second small-unit block Bs.

Thus, the large-unit block BL of the extension mode shown in FIG. 4 sets the sum of the main data M for three frames to 28224 bytes, while the sum of the sub-data is set to 4451 bytes.

Therefore, by constituting the large-unit block BL with 16 sectors, a data volume of 4451 bytes per three frames, that is 4451×75/3=111275 bytes (111.275 kB) per second can be used as sub-data S for the extension mode. This means that the data volume of the sub-data S for the extension mode can be varied to a level exceeding 12 times the data volume of the sub-data S of 365 bytes per three frames, that is 365×75/3=9125 bytes (99.125 kB) per second or 9.125 kBps in terms of the transfer rate, for the standard mode, in which the large-unit block BL is constituted with 14 sectors.

Meanwhile, in the compact disc (CD) graphics (G) or CD-G, routinely used at present in e.g., karaoke, in which the 6 bits of the sub-data R to W are used for the graphics information, the data volume per second is 96×6×75/8=5400 bytes, corresponding to 5.4 kBps in terms of the transfer rate, so that the transfer rate for the extension mode is of a level exceeding 20 times that of the CD-G.

It should be noted that, in the case of the streaming reproduction in the Internet, now in widespread use, that is in writing in the RAM and immediate reproduction of the picture information transmitted over the Internet, the transfer rate in excess of 64 kbps is used. The above-described transfer rate for the extension mode sufficiently meets this transfer rate such that it can be also used sufficiently as the medium on the side of the sender sending the picture signals on the Internet.

Meanwhile, the length of the header H is variable in the above-mentioned standard and extension modes because the data volume of the sub-data S is variable but the header H plus sub-data S is constant.

If the length of the header H is expressed with the number of bytes, number of header bytes=1 byte+($N_{13}$packets)×2 bytes+($N_{13}$Audio$_{13}$Start)×3 bytes.

In this equation, how many packets there are in one sector, how many there are the frames having the newly beginning time codes, and the types of the respective data for the number of packets, are written in the first byte. $N_{13}Packets$ is a variable indicating the number of packets included in a sector, while $N_{13}Audio_{13}Start$ is a variable indicating the number of audio frames newly beginning in the sector. If there is any newly beginning audio frame, a three-byte time code is required.

For example, the data volume of the header H of the sector 6 of FIG. 4 is 1 byte+(3_Packets)*2+(1_$Audio_{13}Start$)*3 bytes=10 bytes.

Also, since the start position of main data M, that is the byte position, is constant in a sector, as shown in FIGS. 2A and 2B, data of left and right channels, totalling at two channels, recorded as main data on an optical disc, can be easily retrieved from the optical disc.

The method of discriminating the standard mode or the extension mode, as the above-mentioned two modes, from each other, is explained. The following explanation is made taking a specified example of a hybrid optical disc having both a high density recording layer (HD layer) for recording the high-speed 1-bit audio signals and a CD layer for recording audio signals etc for a compact disc.

Figure 5:
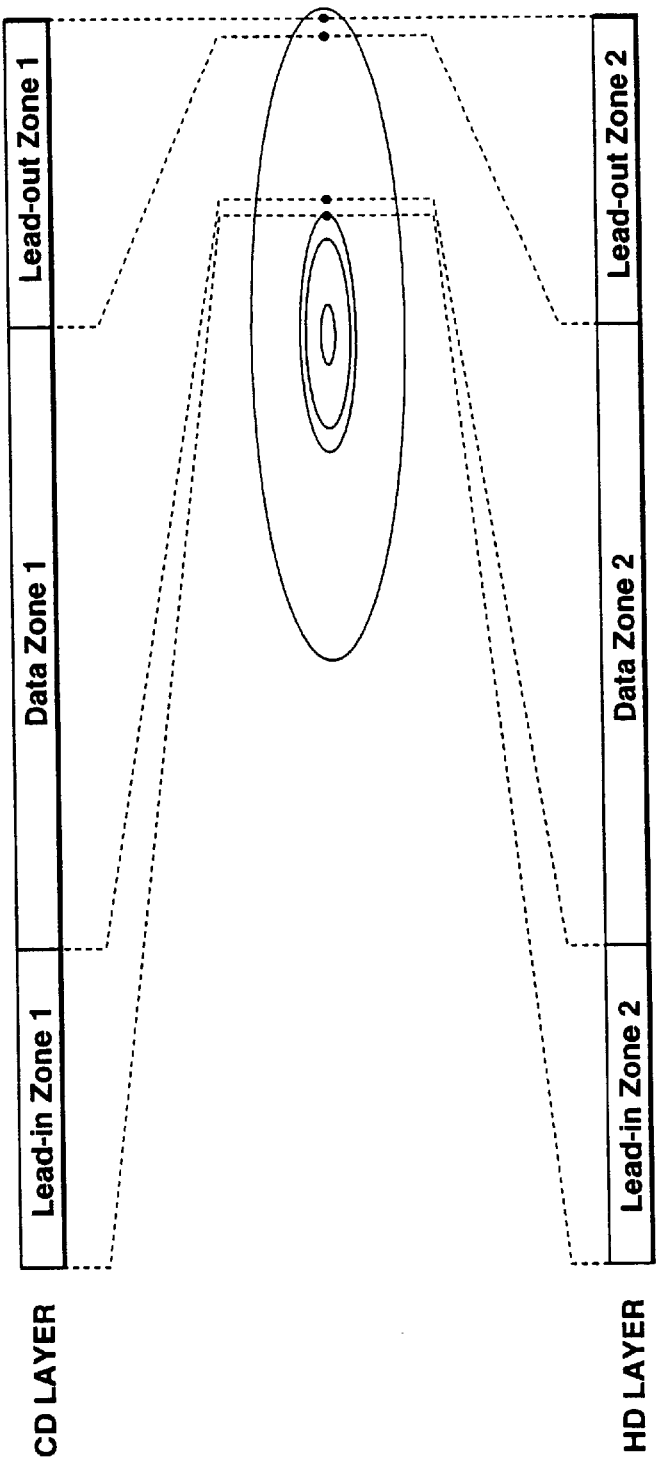
FIG. 5A shows a structure of data recorded on a CD layer 101 shown in FIG. 1.
FIG. 5B shows a structure of data recorded on a HD layer 102 shown in FIG. 1.

First, the hybrid optical disc is explained with reference to FIGS. 5A and 5B. In this hybrid optical disc, master preparation can be achieved by the high-speed 1-bit audio signals for the HD layer shown in FIG. 5B, while the CD sound, simultaneously prepared, can be recorded on the CD layer shown in FIG. 5A. This enables the hybrid optical disc to be reproduced, similarly to the conventional CD, by a conventional CD player. The CD layer and the HD layer each are provided with a lead-in zone, a data zone and a lead-out zone, looking from the inner rim side towards the outer rim side.

Figure 6:
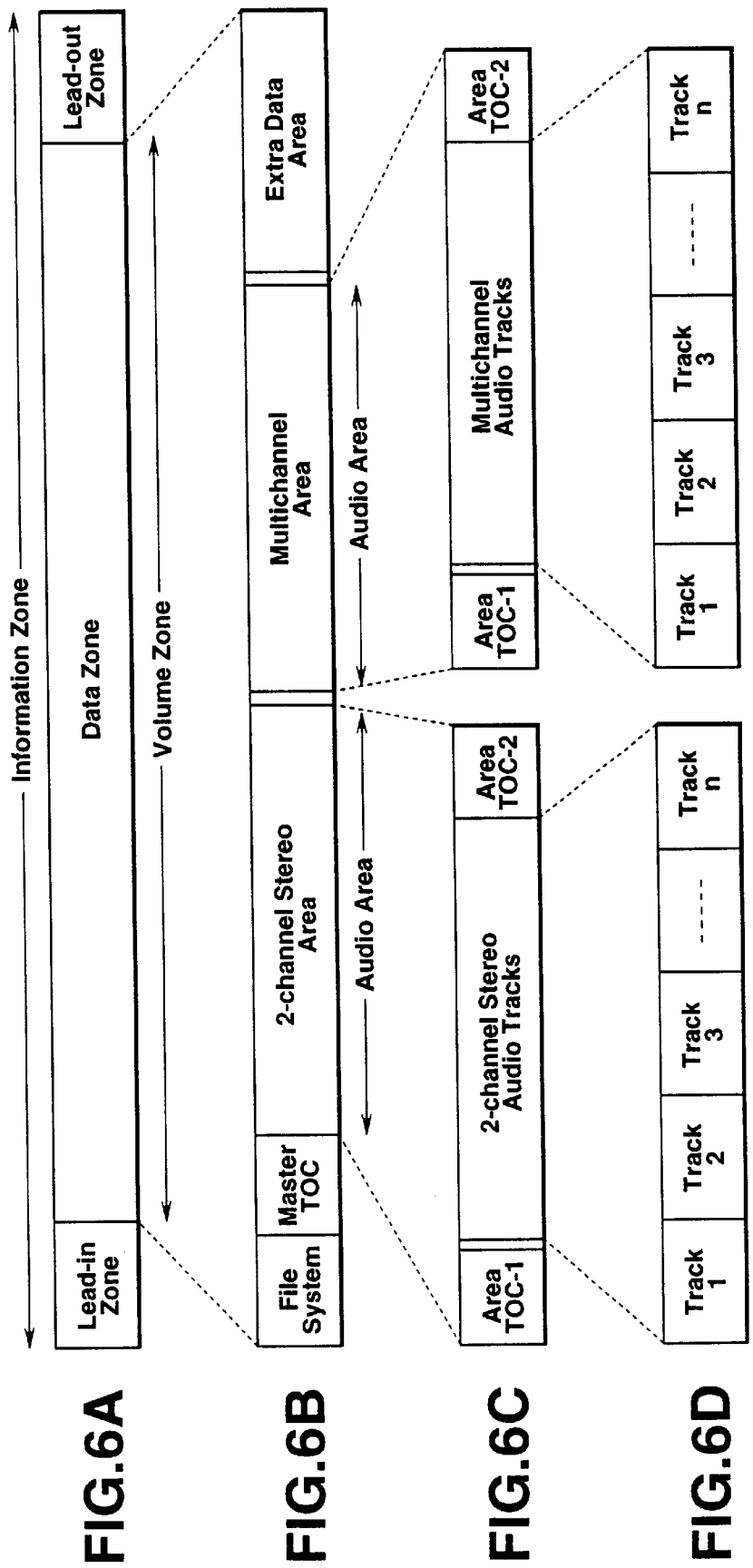
FIG. 6A shows a structure of data recorded on the HD layer 102 shown in FIG. 1.
FIG. 6B shows a more detailed data structure of a data zone shown in FIG. 6A.
FIG. 6C shows a more detailed data structure of an audio area shown in FIG. 6B.
FIG. 6D shows a more detailed data structure of an audio track shown in FIG. 6C.

The HD layer has, in a management area in a data zone, an identifier for discriminating two modes, that is the standard mode and the extension mode, from each other, as discussed above. The management area of the HD layer is hereinafter explained with reference to the detailed format diagram of FIG. 6.

The data zone shown in FIG. 6A includes a two-channel stereo area for recording the sound by the high-speed 1-bit audio signals of the two-channel stereo and a multi-channel area for recording the multi-channel sound, as shown in FIG. 6B. The data zone also includes a file system area, a master TOC area having recorded therein the management information TOC indicating the type of the entire disc, and an extra data area.

The ancillary information, such as the above-mentioned graphics information, is recorded as sub-data in a two-channel stereo area. This two-channel stereo area has the two-channel stereo audio tracks, that are made up of n tracks (track 1, 2, 3, . . . , n) shown in FIG. 6D and which are sandwiched between the two area tracks (Area TOC-1 and Area TOC-2), as shown in FIG. 6C.

The HD layer of the hybrid optical disc records the aforementioned identifier for discriminating the sub-data having the variably controlled data volume as the mode discriminating information, with the two area TOCs (Area TOC-1 and Area TOC-2) as the management area. Although the two area TOCs (Area TOC-1 and Area TOC-2) serve as the management area, only one of the Area TOC-1 or Area TOC-2 suffices. The above-mentioned identifier may also be written in the master TOC area as the management area.

Figure 7:
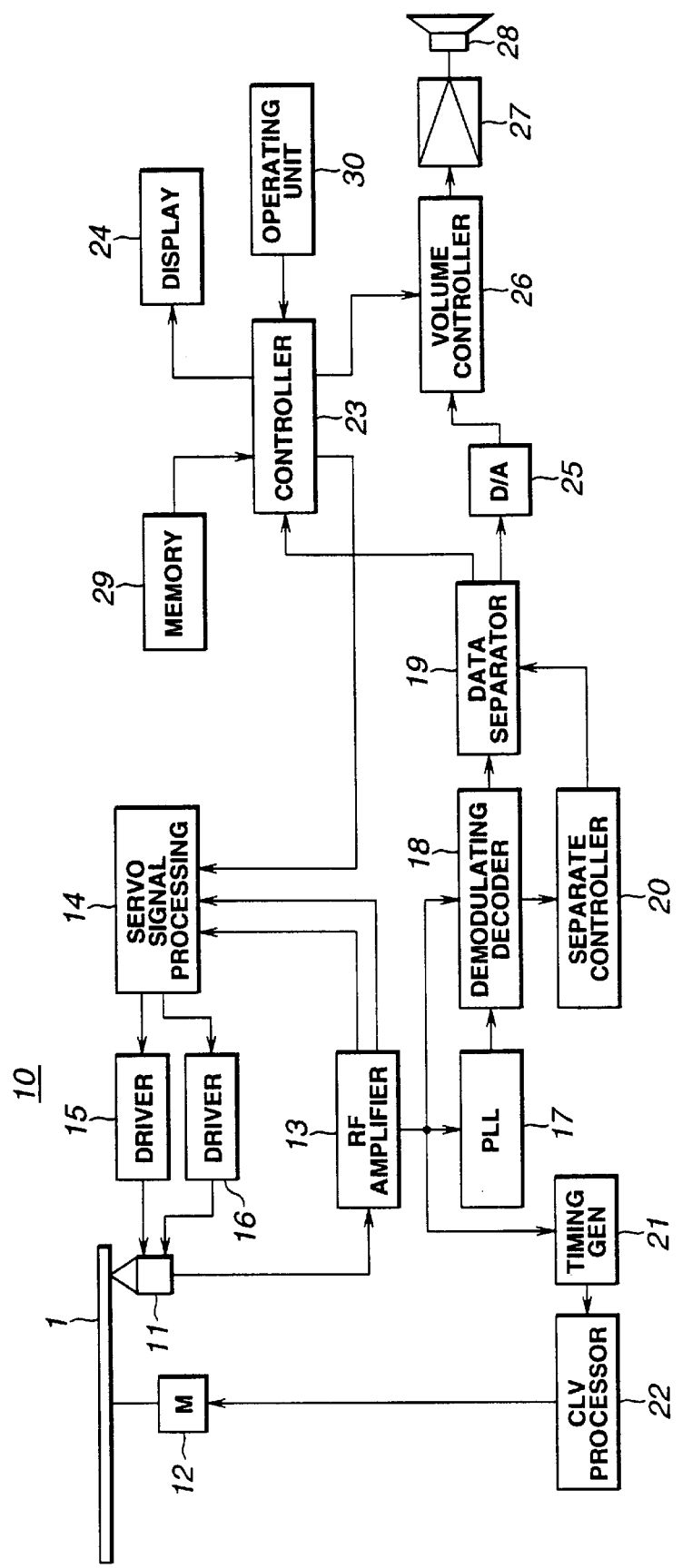
FIG. 7 is a block diagram of a reproducing apparatus embodying the present invention.

If the above-mentioned identifier, recorded in the management area, is read out by the optical disc reproducing device shown in FIG. 7 to grasp the above-mentioned standard mode or the extension mode, the user is able to reproduce e.g., the graphics information with the transfer rate of 9.125 kBps or 111.275 kBs.

Referring to FIG. 7, the present optical disc reproducing device includes an optical read-out unit 11, such as a pickup, producing read-out signals from the HD layer of the hybrid optical disc 1, an RF amplifier 13 for generating playback data from read-out signals of the optical read-out unit 11, a demodulation decoder 18 for demodulating and decoding the large-unit block BL from the playback data of the RF amplifier 13, and a data separator 19 for separating the main data M and the sub-data S from the large-unit block BL decoded by the demodulation decoder 18. The reproducing device also includes a separate controller 20 for controlling the data separator 19 based on the mode discriminating information recorded in the management area, such as the above-mentioned Area TOC-1 and Area TOC-2.

The optical disc reproducing device 10 also includes a phase lock loop (PLL) circuit 17 for generating clock signals synchronized with the reproducing signals form the RF amplifier 13, a servo signal processor 14 for causing the optical read-out unit 11 to follow the optical disc 1 based on error playback signals from the RF amplifier 13, a focussing driver 15 for driving the focussing coil constituting the optical read-out unit 11, respective drivers 16 for driving a tracking coil or a thread mechanism, a timing generating circuit 21 for rotating the optical disc 1 at a CLV from the playback signals from the RF amplifier 13, and a CLV processor 22 for generating CLV control signals responsive to the timing signals from the timing generating circuit 21. The optical disc reproducing device 10 also includes a spindle motor 12 for receiving the CLV control signals from the CLV processor 22 to run the optical disc 1 in rotation at CLV.

The optical disc reproducing device 10 also includes a controller 23 for deciphering the sub-data from the data separator 19 to cause the graphics information to be displayed on a display unit 24, connected for this purpose to the controller 23, an actuating unit 30, a memory 29, and a D/A converter 25 for converting the main data M from the data separator 19. The optical disc reproducing device 10 further includes a volume controller 26 for volume-controlling the analog audio signals under control by the controller 23, an amplifier 27 and a speaker 28.

The optical read-out unit 11 is made up of an objective lens, a laser, a detector and a focussing coil etc. The focussing driver 15 is controlled by a servo signal processing circuit 14. The optical read-out unit 11 includes, in addition to the above components, a tracking coil for driving the objective lens radially of the optical disc 1 and a thread mechanism for driving the optical system radially of the optical disc. The respective coils are directly driven by the respective drivers.

The servo signal processing circuit 14, PLL circuit 17, a demodulating decoder 18, a data separator 19, a separate controller 20, a timing generating circuit 21 and the CLV processor 22 may be constituted in a digital signal processor.

The operation of the above-described optical disc reproducing device 10 is hereinafter explained. It the following explanation, it is presupposed that the HD layer 102 of FIG. 1 is to be reproduced. The optical disc 1 is chucked so as to be rotationally driven by the spindle motor 12. From the optical disc 1, run in rotation at CLV, the recording information is read out by the optical read-out unit 11 to produce read-out signals.

The read-out signals, converted by the detector of the optical read-out unit 11, are fed to the RF amplifier 13. The RF amplifier 13 converts the read-out signals into playback signals, while generating tracking error signals and the focussing error signals from the read-out signals to route the error signals to the servo signal processor 14.

The servo signal processor 14 drives the focussing driver 15 and the respective drivers 16 to reduce the tracking error signals and the focussing error signals to zero.

The playback signals from the RF amplifier 13 are routed to the demodulation decoder 18 and to the PLL circuit 17. The demodulation decoder 18 demodulates and decodes the playback signals to route the large-unit block BL data shown in FIGS. 2A, 2B, 3 and 4 to the data separator 19.

The data separator 19 separates the main data M and the sub-data S from the large-unit block BL data. On the other hand, the separate controller 20 reads the mode conversion identification information, as the aforementioned identifier, from the large-unit block BL data, to recognize whether the large-unit block BL data has been recorded in the standard mode or in the extension mode, in order to control the separation operation in the data separator 19.

Since the data separator 19 can send the sub-data recorded in the pre-set mode so that the controller 23 is able to display the graphics information in the display unit 24 at the transfer rate of 9.125 kbps or 111.276 kBps.

Thus, in an optical disc having the data zone of the format shown in FIGS. 2A, 2B, 3 and 4, it is possible to change only the data volume of supplementary data without changing the data volume of the main data recorded in unit time. Since the transfer rate higher than that used for sub-data of the compact disc at the minimum is guaranteed as the transfer rate used in the sub-data of the compact disc, all sorts of the application exploiting the CD sub-code can be realized. The Internet application is possible with the mode which realizes the transfer rate in excess of 64 kBs. As the mode exceeding the standard mode, the display of high-quality still picture and the karaoke application which is based on the high-quality still picture is also possible.

Moreover, in any case, only the transfer rate for the ancillary information can be switched depending on the mode while the constant recording specifications of the music data as main data and high sound quality are maintained. Also, since there is only one sort of the recording specifications of the source serving as the sound source, there is no necessity of providing a formulating mechanism for plural sorts of the recording specifications. The source management for the sound source is facilitated because there is no necessity of supervising plural sorts of the recording specifications. The designing of the formulating apparatus centered about the recorder is also facilitated because there is only one sort of the recording specifications.

What is claimed is:

1. A recording medium, comprising:
   a program area in which digital data made up of a header, main data and sub data is blocked and recorded with a variable number of sectors, with a unit sector having a pre-set data length; and
   a management area in which there is recorded an identifier for discriminating the variable number of sectors in order to render a data volume of the sub data variable with a volume of the main data in a block remaining fixed.

2. The recording medium according to claim 1, wherein the data length of the header is changed according to changes in the variable number of sectors.

3. The recording medium according to claim 1, wherein the recording medium is a disc-shaped recording medium having multiple layers.

4. The recording medium according to claim 3, wherein digital signals of multiple quantization bits sampled at a pre-set sampling frequency are recorded on one of the multiple layers of said recording medium, and
   wherein digital signals of a single quantization bit sampled at a frequency an integer number times the pre-set sampling frequency are recorded in another of the multiple layers.

5. The recording medium according to claim 4, wherein the program area in which the digital data made up of the header, the main data and the sub data that is blocked and recorded with the variable number of sectors, with the unit sector being of the pre-set data length, and the management area in which there is recorded the identifier for discriminating the variable number of sectors in order to render the data volume of the sub data variable with the volume of the main data in the block remaining fixed, are provided in the another of the multiple layers.

6. A recording/reproducing apparatus for reproducing a recording medium having a program area in which digital data made up of a header, main data and sub data is blocked and recorded with a variable number of sectors, with a unit sector being of a pre-set data length, and a management area having recorded therein an identifier for discriminating a variable number of sectors in order to render a data volume of the sub data variable with a volume of the main data in a block remaining fixed, said recording/reproducing apparatus comprising:
   reproducing means for reproducing the digital data recorded in said program area and the identifier recorded in said management area;
   separating means for separating the main data and the sub data from the digital data reproduced by said reproducing means from the program area of the recording medium; and
   control means for controlling said separating means based on said identifier that is reproduced from said management area of said recording medium by said reproducing means and which is used for identifying the variable number of sectors.

7. The recording/reproducing apparatus according to claim 6, wherein the data length of said header is varied depending on a change in said variable number of sectors.

8. The recording/reproducing apparatus according to claim 6, wherein the recording medium is a disc-shaped recording medium having multiple layers.

9. The recording/reproducing apparatus according to claim 8, wherein digital signals of multiple quantization bits sampled at a pre-set sampling frequency are recorded on one of the multiple layers of said recording medium, and
   wherein digital signals of a single quantization bit sampled at a frequency an integer number times the pre-set sampling frequency are recorded in another of the multiple layers.

10. The recording/reproducing apparatus according to claim 9, wherein the program area in which the digital data made up of the header, the main data and the sub data that is blocked and recorded with the variable number of sectors, with the unit sector being of the pre-set data length, and the management area in which there is recorded an identifier for discriminating the variable number of sectors in order to render the data volume of the sub data variable with the volume of the main data in the block remaining fixed, are provided in the another of the multiple layers.

* * * * *